(12) United States Patent     (10) Patent No.:   US 12,608,735 B2

Gill et al.              (45) Date of Patent:      Apr. 21, 2026

---

(54) SYSTEMS AND METHODS FOR PROVIDING CUSTOMIZED RECOMMENDATIONS VIA DATA ANALYSIS

(71) Applicant: Capital One Services, LLC, McLean, VA (US)

(72) Inventors: Renee Gill, New York, NY (US); Michael Mossoba, Great Falls, VA (US); Alex Hergenroeder, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 343 days.

(21) Appl. No.: 18/165,911

(22) Filed: Feb. 7, 2023

(65)           Prior Publication Data

US 2024/0265432 A1     Aug. 8, 2024

(51) Int. Cl.
    *G06Q 30/0601*       (2023.01)

(52) U.S. Cl.
    CPC ................................ *G06Q 30/0631* (2013.01)

(58) Field of Classification Search
    None
    See application file for complete search history.

(56)           References Cited

U.S. PATENT DOCUMENTS 10,460,464 B1 *   10/2019   Hasan ........................ G06T 7/62
  2021/0082028 A1 *   3/2021   Chen .................. G06Q 30/0205

FOREIGN PATENT DOCUMENTS

CN      111915400 A    11/2020

OTHER PUBLICATIONS

IP.com Disclosure No. IPCOM000260082D; Publication Date: Oct. 21, 2019; Published in: The IP.com Prior Art Database; Language: English (United States); https://ip.com/IPCOM/000260082 (Year: 2019).*

* cited by examiner

*Primary Examiner* — Michelle T Kringen

(74) *Attorney, Agent, or Firm* — TROUTMAN PEPPER LOCKE LLP; Christopher J. Forstner; John A. Morrissett

(57)           ABSTRACT

Disclosed embodiments may include a system for providing customized recommendations via data analysis. The system may receive transaction data associated with a user. The system may cause a user device associated with the user to display a notification prompting the user to provide image data. The system may receive the image data. The system may identify, from the image data via computer vision, first object(s). The system may generate, via an MLM, first item recommendation(s) based on the first object(s). The system may cause the user device to display, via the GUI, the first item recommendation(s). The system may receive type(s) of travel data. The system may generate, via the MLM, second item recommendation(s) based on the type(s) of travel data. The system may transmit, to a merchant system, a request to purchase at least one item at a predefined location based on the second item recommendation(s).

20 Claims, 4 Drawing Sheets

FIG. 1A

100

START

RECEIVE FIRST TRANSACTION DATA ASSOCIATED WITH A USER — 102

CAUSE A USER DEVICE ASSOCIATED WITH THE USER TO DISPLAY A NOTIFICATION, VIA A GUI, PROMPTING THE USER TO PROVIDE FIRST IMAGE DATA — 104

RECEIVE THE FIRST IMAGE DATA — 106

IDENTIFY, FROM THE FIRST IMAGE DATA VIA COMPUTER VISION, FIRST OBJECT(S) — 108

GENERATE, VIA AN MLM, FIRST ITEM RECOMMENDATION(S) BASED ON THE FIRST OBJECT(S) — 110

CAUSE THE USER DEVICE TO DISPLAY, VIA THE GUI, THE FIRST ITEM RECOMMENDATION(S) — 112

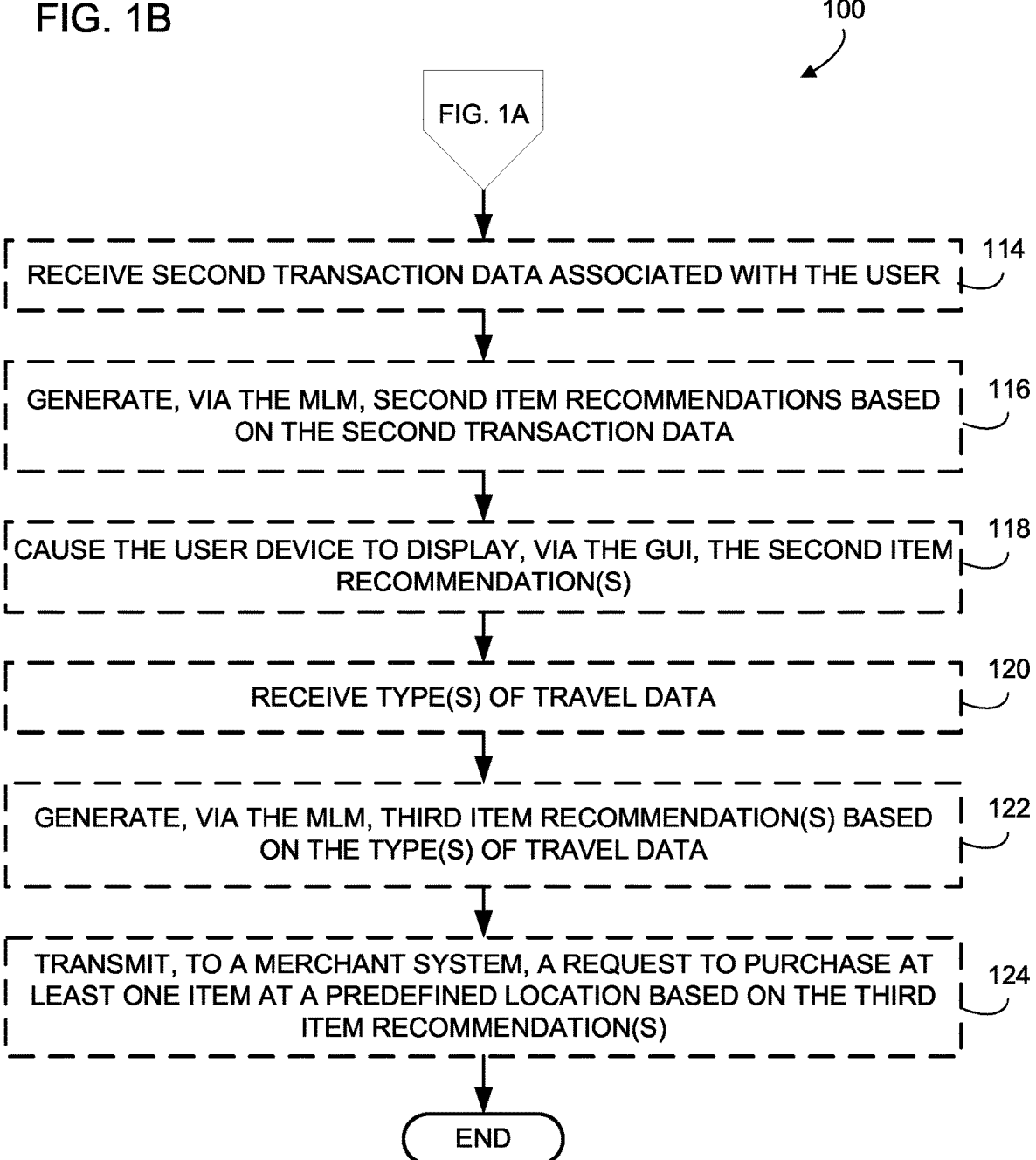

FIG. 1A

RECEIVE SECOND TRANSACTION DATA ASSOCIATED WITH THE USER — 114

GENERATE, VIA THE MLM, SECOND ITEM RECOMMENDATIONS BASED ON THE SECOND TRANSACTION DATA — 116

CAUSE THE USER DEVICE TO DISPLAY, VIA THE GUI, THE SECOND ITEM RECOMMENDATION(S) — 118

RECEIVE TYPE(S) OF TRAVEL DATA — 120

GENERATE, VIA THE MLM, THIRD ITEM RECOMMENDATION(S) BASED ON THE TYPE(S) OF TRAVEL DATA — 122

TRANSMIT, TO A MERCHANT SYSTEM, A REQUEST TO PURCHASE AT LEAST ONE ITEM AT A PREDEFINED LOCATION BASED ON THE THIRD ITEM RECOMMENDATION(S) — 124

END

SYSTEMS AND METHODS FOR PROVIDING CUSTOMIZED RECOMMENDATIONS VIA DATA ANALYSIS

FIELD

The disclosed technology relates to systems and methods for providing customized recommendations via data analysis. Specifically, this disclosed technology relates to providing a user with travel item recommendations based on evaluating one or more types of data.

BACKGROUND

Traditional data analysis techniques typically focus on providing objective analysis (e.g., factual, mathematical, etc.) based on various types of data, such as image data or transaction data. These techniques are typically limited in terms of gleaning personal or subjective information specific to individual users associated with the data.

Accordingly, there is a need for improved systems and methods for providing customized recommendations via data analysis. Embodiments of the present disclosure may be directed to this and other considerations.

SUMMARY

Disclosed embodiments may include a system for providing customized recommendations via data analysis. The system may include one or more processors, and memory in communication with the one or more processors and storing instructions that, when executed by the one or more processors, are configured to cause the system to provide customized recommendations via data analysis. The system may receive transaction data associated with a user. Responsive to receiving the transaction data, the system may cause a user device associated with the user to display a notification, via a graphical user interface (GUI), prompting the user to provide first image data. Responsive to causing the user device to display the notification, the system may receive the first image data. The system may identify, from the first image data via computer vision, one or more first objects. The system may generate, via a machine learning model (MLM), one or more first item recommendations based on the one or more first objects. The system may cause the user device to display, via the GUI, the one or more first item recommendations. The system may receive one or more types of travel data. The system may generate, via the MLM, one or more second item recommendations based on the one or more types of travel data. The system may transmit, to a merchant system, a request to purchase at least one item at a predefined location based on the one or more second item recommendations.

Disclosed embodiments may include a system for providing customized recommendations via data analysis. The system may include one or more processors, and memory in communication with the one or more processors and storing instructions that, when executed by the one or more processors, are configured to cause the system to provide customized recommendations via data analysis. The system may receive first transaction data associated with a user. Responsive to receiving the first transaction data, the system may cause a user device associated with the user to display a notification, via a GUI, prompting the user to provide first image data. Responsive to causing the user device to display the notification, the system may receive the first image data. The system may identify, from the first image data via computer vision, one or more first objects. The system may generate, via an MLM, one or more first item recommendations based on the one or more first objects. The system may cause the user device to display, via the GUI, the one or more first item recommendations. The system may receive second transaction data associated with the user. The system may generate, via the MLM, one or more second item recommendations based on the second transaction data. The system may cause the user device to display, via the GUI, the one or more second item recommendations.

Disclosed embodiments may include a system for providing customized recommendations via data analysis. The system may include one or more processors, and memory in communication with the one or more processors and storing instructions that, when executed by the one or more processors, are configured to cause the system to provide customized recommendations via data analysis. The system may receive transaction data associated with a user. The system may generate, via an MLM, one or more first item recommendations based on the transaction data. The system may cause a user device associated with the user to display, via a GUI, the one or more first item recommendations. The system may receive one or more types of travel data. The system may generate, via the MLM, one or more second item recommendations based on the one or more types of travel data. The system may transmit, to a merchant system, a request to purchase at least one item at a predefined location based on the one or more second item recommendations.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 1A-1B are a flow diagram illustrating an exemplary method for providing customized recommendations via data analysis, in accordance with certain embodiments of the disclosed technology.

DETAILED DESCRIPTION

Figure 2:
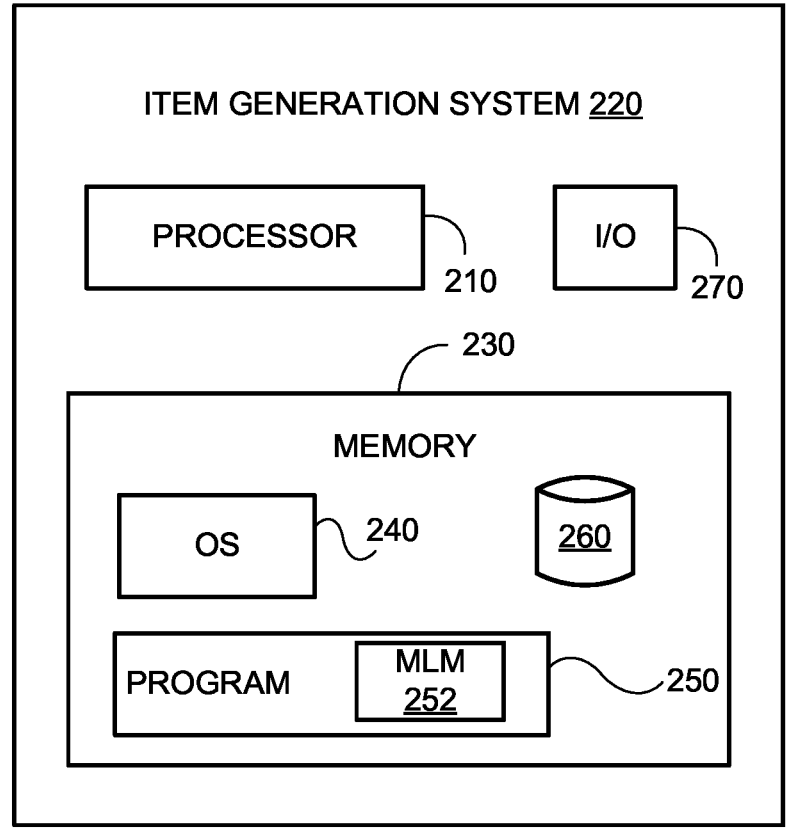
FIG. 2 is a block diagram of an example item generation system used to provide customized recommendations via data analysis, in accordance with certain embodiments of the disclosed technology.

Traditional data analysis techniques typically focus on identifying factual or objective features associated with the analyzed data; however, are not configured to derive a customized travel recommendation based on that data, much less determine whether a user associated with the data may have a need or desire to obtain specific items for an upcoming or ongoing trip. As such, disclosed embodiments may provide more accurate data analysis results by employing user data, e.g., transaction data, and correlating it with image data and/or other travel-oriented data to more accurately provide insights on MLM-driven data analysis techniques.

Accordingly, examples of the present disclosure may provide for generating travel item recommendations prior to and/or during individuals' travels, and facilitating the ordering and transmitting of various items to individuals at their respective travel destinations. Specifically, examples of the present disclosure may provide for receiving transaction data, travel data, and/or image data associated with a user, generating travel item recommendations based on the transaction, travel, and/or image data, and transmitting requests to merchant systems to provide the user with certain items, based on the recommendations, at a predefined location (e.g., the user's ultimate travel destination).

Disclosed embodiments may employ machine learning models (MLMs), among other computerized techniques, to generate a travel item recommendation based on one or more types of data. Machine learning models are a unique computer technology that involves training models to complete tasks and make decisions. These techniques may help to improve database and network operations. For example, the systems and methods described herein may utilize, in some instances, MLMs, which are necessarily rooted in computers and technology, to evaluate transaction data, travel data (e.g., travel advisories), and/or image data (e.g., provided via computer vision technology). This, in some examples, may involve using transaction, travel, and/or image input data and an MLM, applied to generate a travel item recommendation. Using an MLM and a computer system configured in this way may allow the system to provide accurate and efficient travel item recommendations to users before and/or during their travels.

This may provide an advantage and improvement over prior technologies that may not provide a recommendation as customized or tailored to a specific user, that require the iterative collection and evaluation of multiple types of data from multiple sources to ensure individuals are adequately prepared for upcoming travel, and/or the knowledge and ability to navigate services and systems as needed at a given travel destination. The present disclosure solves this problem by taking a variety of user-specific factors into consideration (e.g., image data, transaction data, travel data, etc.) when generating customized travel item recommendations, and facilitating the purchasing and transmitting of items to users at their respective travel destinations. Furthermore, examples of the present disclosure may also improve the speed with which computers can determine travel item recommendations. Overall, the systems and methods disclosed have significant practical applications in the travel field because of the noteworthy improvements of the customization and automation of item recommendation and transmission, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIGS. 1A-1B are a flow diagram illustrating an exemplary method 100 for generating travel items, in accordance with certain embodiments of the disclosed technology. The steps of method 100 may be performed by one or more components of the system 300 (e.g., item generation system 220 or web server 310 of travel recommendation system 308, or user device 302), as described in more detail with respect to FIGS. 3 and 4. While certain blocks may be identified as being optional, certain embodiments may omit blocks even if they are not necessarily identified as being optional.

In block 102 of FIG. 1A, the item generation system 220 may receive transaction data associated with a user. For example, the item generation system 220 may be owned and/or operated by an entity (e.g., a financial institution) that monitors transaction data associated with the user. In some embodiments, the item generation system 220 may be configured to utilize the received transaction data to determine whether a user may be planning an upcoming trip. For example, the system may be configured to evaluate the transaction data by identifying, for example, a date, time, transaction amount, merchant identifier, etc., that may indicate a likelihood that the user is planning upcoming travel. For example, the user may have made a flight reservation for an upcoming date and time, an excursion reservation in a location outside of the user's home city and/or state, etc.

In optional block 104, responsive to receiving the transaction data, the item generation system 220 may cause a user device associated with the user to display a notification, via a GUI, prompting the user to provide first image data. For example, having determined the user may likely be planning an upcoming trip based on the received transaction data, the system may be configured to prompt the user to upload an image of the clothing, items, etc., that the user plans to take on his or her upcoming trip. For example, the user may download an application on his or her mobile device, the application having an image capture feature that can directly transmit a captured image (e.g., a photo) to an application, browser extension, etc., configured to review the image, as further discussed below.

In optional block 106, responsive to causing the user device to display the notification, the item generation system 220 may receive the first image data. For example, the user may take a photo of clothing, items, etc. that the user plans to take on the upcoming trip, and may upload or otherwise submit the photo via a form of program, application, web browser extension, etc., configured to evaluate the image, as further discussed below. In some embodiments, the system may receive the first image data via a smart device. For example, a user may be wearing smart glasses as he or she is packing for an upcoming trip such that the system may receive the first image data in real-time, for example, as the user makes packing selections.

In optional block 108, the item generation system 220 may identify, from the first image data via computer vision, one or more first objects. For example, the system may utilize computer vision technology configured to tag certain objects within the image (e.g., shoes, a jacket, an umbrella, a camping tent, etc.), and/or categorize the objects by type (e.g., clothing, gear, etc.), such that the system can determine what items, or types of items, the user plans to bring on an upcoming trip.

In some embodiments, if the system determines it cannot identify one or more objects from the first image data, for example, due to the items being obscured within the image, the system may be configured to prompt the user to provide additional image data. Providing this type of customer feedback loop may provide a benefit of ensuring the system can accurately identify objects to provide the user with more customized travel item recommendations, as further discussed below.

In optional block 110, the item generation system 220 may generate, via an MLM, one or more first item recommendations based on the one or more first objects. In some embodiments, the system may be configured to compare the objects identified in the first (and/or additional) image data with a predefined database of items users typically carry when traveling to various destinations around the world. In some embodiments, the system may be configured to limit the item recommendations to a certain number of items, such as fifteen items, determined to be most relevant to the user. For example, the system may be configured to determine relevance based on customer preferences and/or historical transaction data associated with the user, for example, what the user has historically purchased ahead of and/or during a trip, and/or whether the user has historically traveled to certain destinations for different purposes (e.g., business or personal).

In optional block 112, the item generation system 220 may cause the user device to display, via the GUI, the one or more first item recommendations. For example, the system may transmit a notification to the user via, e.g., an email, a push-notification, an SMS message, an in-application message or chat, etc.

Turning to FIG. 1B, in optional block 114, the item generation system 220 may receive second transaction data associated with the user. In some embodiments, the second transaction data may be the same as or similar to the first transaction data, as discussed above with respect to block 102.

In some embodiments, the second transaction data may be associated with a date and/or time after which the system provided the one or more first item recommendations to the user, as discussed above with respect to block 112. The system may thus be configured to monitor incoming transaction data that may indicate whether the user accepted any of the first item recommendations. For example, if the system recommended the user pack ear plugs, for example due to the user's upcoming travel destination being a large city, the system may track whether the user in fact purchased ear plugs following the receipt of that recommendation. A benefit of this post-recommendation transaction monitoring is that the system may be configured to continuously train and update its model to provide future travel item recommendations that are more tailored or customized to a given user, as further discussed below.

In some embodiments, the second transaction data may be associated with a specific transaction such that the system may provide the user with one or more recommendations, as further discussed below, tailored to that specific transaction. For example, the second transaction data may indicate the user has made an upcoming reservation at a higher-end restaurant. The system may be configured to generate a recommendation based on that reservation. For example, the system may generate a recommendation (e.g., and later transmit that recommendation to the user) suggesting the user purchase and/or pack a more formal outfit to wear to the upcoming meal.

In optional block 116, the item generation system 220 may generate, via the MLM, one or more second item recommendations based on the second transaction data. In some embodiments, the system may be configured to provide one or more customized recommendations based on a prediction that the user is likely planning an upcoming trip, as discussed above with respect to block 102. For example, the user may have made a flight reservation for an upcoming date and time, an excursion reservation in a location outside of the user's home city and/or state, etc. Based on this transaction data, the system may be configured to provide the user with customized recommendations for clothing, items, etc., that may be of help or use to the user on this particular upcoming trip based on, for example, the type of activities or excursions, the time of year (e.g., the season), the formality of various reservations (e.g., an upper scale restaurant), and the like.

In some embodiments, when the system has already provided the user with initial customized recommendations, for example, based on transaction data (block 102) and/or image data (block 110), the system may be configured to provide a user with revised or additional customized recommendations based on the user's transactions that occurred after the first or initial recommendations were provided to the user, and/or with respect to specific transactions, as discussed above.

In optional block 118, the item generation system 220 may cause the user device to display, via the GUI, the one or more second item recommendations. This step may be the same as or similar to block 112.

In optional block 120, the item generation system 220 may receive one or more types of travel data. In some embodiments, the travel data may include, for example, travel advisories, weather information, climate conditions, planned or potential travel activities, etc., associated with the user's travel destination. In some embodiments, the system may be configured to receive the travel data via, for example, a web crawler or other form of program or application configured to retrieve information from various sources, one or more third-party application programming interfaces (APIs), etc. In some embodiments, the travel data may include keywords or phrases that may be received via a voice-controlled virtual assistant. For example, the virtual assistant may be configured, e.g., based on user preferences, to receive statements or requests directly from the user, and/or to identify certain keywords or phrases based on ambient conversations between the user and one or more other individuals that may indicate the user needs certain items while on a trip.

In optional block 122, the item generation system 220 may generate, via the MLM, one or more third travel item recommendations based on the one or more types of travel data. For example, the system may further customize its recommendations to a specific user based on the travel data corresponding to the user's particular travel destination.

In optional block 124, the item generation system 220 may transmit, to a merchant system, a request to purchase at least one item at a predefined location based on the one or more third item recommendations (and/or second item recommendations, block 116). In some embodiments, the system may be configured to automatically determine the most relevant or highest priority item of the third item recommendations based on, for example, the user's travel destination, whether the user is likely to travel on business or for personal reasons, etc. In some embodiments, the system may automatically select an item, and determine a merchant that may sell the selected item. In some embodiments, the system may conduct a comparison of the selected item at one or more merchants to weigh and balance various factors, such as cost, shipping fees, shipping timeline, whether the user has an account, points, rewards, etc. with a merchant, and the like. In some embodiments, the system may select a merchant to provide the selected item, may automatically purchase the selected item from the merchant on behalf of the user, and/or may schedule delivery of the selected item to the user at the user's travel destination (e.g., the user's hotel). In some embodiments, the system may be configured to select the merchant, purchase the item, and/or schedule the delivery, as discussed above, based on previously received user preferences and/or user input, as further discussed below.

In some embodiments, the system may be configured to cause the user device to display a customized and interactive display configured to display the generated recommendations and/or notifications, as discussed herein, and/or selectable user input objects to enable the user to respond to the system's various outputs. For example, the customized and interactive display may provide the user with a listing of the top fifteen most relevant item recommendations for the user's upcoming trip, along with selectable user input objects (e.g., buttons, toggle switches, text boxes, drop-down menus) next to each item such that the user may select, for example, which item(s) the user wishes the system to purchase, a date and/or time the user wishes to have such item(s) delivered, a location to which the user wishes the item(s) be delivered, and the like. Responsive to the user's various selections within the customized and interactive display, the system may be configured to receive the user's selection(s), and conduct a merchant search and comparison for the selected item(s), as discussed above.

Figure 3:
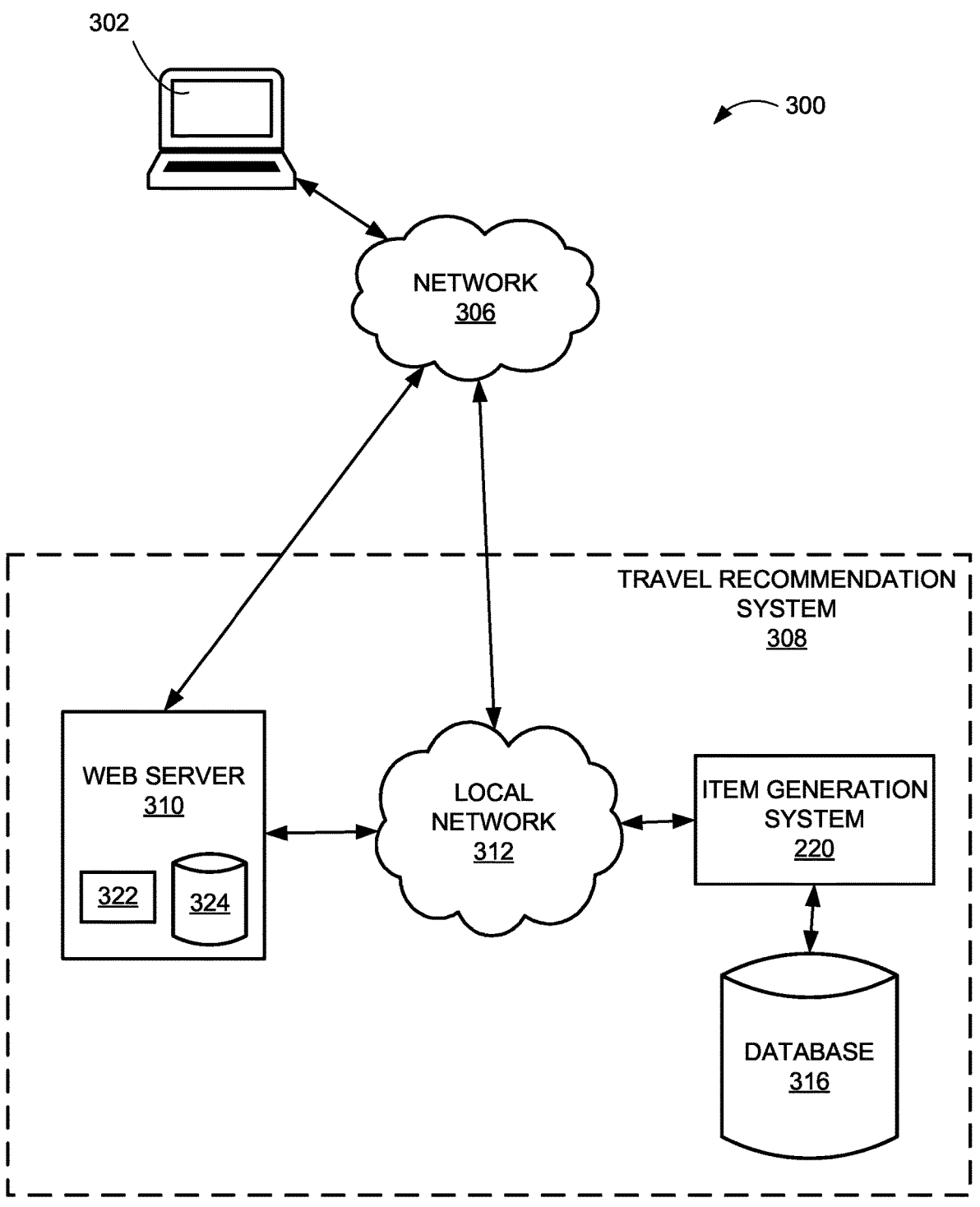
FIG. 3 is a block diagram of an example system that may be used to provide customized recommendations via data analysis, in accordance with certain embodiments of the disclosed technology.

FIG. 2 is a block diagram of an example item generation system 220 used to generate travel items according to an example implementation of the disclosed technology. According to some embodiments, the user device 302 and web server 310, as depicted in FIG. 3 and described below, may have a similar structure and components that are similar to those described with respect to item generation system 220 shown in FIG. 2. As shown, the item generation system 220 may include a processor 210, an input/output (I/O) device 270, a memory 230 containing an operating system (OS) 240 and a program 250. In some embodiments, program 250 may include an MLM 252 that may be trained, for example, to generate travel item recommendations based on one or more types of data (e.g., image data, transaction data, travel data, etc.). In certain implementations, MLM 252 may issue commands in response to processing an event, in accordance with a model that may be continuously or intermittently updated. Moreover, processor 210 may execute one or more programs (such as via a rules-based platform or the trained MLM 252), that, when executed, perform functions related to disclosed embodiments.

In certain example implementations, the item generation system 220 may be a single server or may be configured as a distributed computer system including multiple servers or computers that interoperate to perform one or more of the processes and functionalities associated with the disclosed embodiments. In some embodiments item generation system 220 may be one or more servers from a serverless or scaling server system. In some embodiments, the item generation system 220 may further include a peripheral interface, a transceiver, a mobile network interface in communication with the processor 210, a bus configured to facilitate communication between the various components of the trust score generation system 220, and a power source configured to power one or more components of the trust score generation system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the item generation system 220 may include one or more storage devices configured to store information used by the processor 210 (or other components) to perform certain functions related to the disclosed embodiments. In one example, the item generation system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The item generation system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the item generation system 220 may include the memory 230 that may include one or more programs 250 to perform one or more functions of the disclosed embodiments. For example, in some embodiments, the item generation system 220 may additionally manage dialogue and/or other interactions with the customer via a program 250.

The processor 210 may execute one or more programs 250 located remotely from the trust score generation system 220. For example, the item generation system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the item generation system 220 to perform one or more of the processes and functionalities associated with the disclosed embodiments.

The database 260 may include stored data relating to status data (e.g., average session duration data, location data, idle time between sessions, and/or average idle time between sessions) and historical status data. According to some embodiments, the functions provided by the database 260 may also be provided by a database that is external to the item generation system 220, such as the database 316 as shown in FIG. 3.

The item generation system 220 may also be communicatively connected to one or more memory devices (e.g., databases) locally or through a network. The remote memory devices may be configured to store information and may be accessed and/or managed by the item generation system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The item generation system 220 may also include one or more I/O devices 270 that may comprise one or more interfaces for receiving signals or input from devices and providing signals or output to one or more devices that allow data to be received and/or transmitted by the item generation system 220. For example, the item generation system 220 may include interface components, which may provide interfaces to one or more input devices, such as one or more keyboards, mouse devices, touch screens, track pads, trackballs, scroll wheels, digital cameras, microphones, sensors, and the like, that enable the item generation system 220 to receive data from a user (such as, for example, via the user device 302).

In examples of the disclosed technology, the item generation system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The item generation system 220 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The item generation system 220 may be configured to adjust model parameters during training. Model parameters may include weights, coefficients, offsets, or the like. Training may be supervised or unsupervised.

The item generation system 220 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The item generation system 220 may be configured to optimize statistical models using known optimization techniques.

Furthermore, the item generation system 220 may include programs configured to retrieve, store, and/or analyze properties of data models and datasets. For example, item generation system 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The item generation system 220 may include algorithms to determine a data type, key-value pairs, row-column data structure, statistical distributions of information such as keys or values, or other property of a data schema may be configured to return a statistical profile of a dataset (e.g., using a data-profiling model). The item generation system 220 may be configured to implement univariate and multivariate statistical methods. The item generation system 220 may include a regression model, a Bayesian model, a statistical model, a linear discriminant analysis model, or other classification model configured to determine one or more descriptive metrics of a dataset. For example, item generation system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The item generation system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, item generation system 220 may be configured to generate a similarity metric representing a measure of similarity between data in a dataset. A similarity metric may be based on a correlation, covariance matrix, a variance, a frequency of overlapping values, or other measure of statistical similarity.

The item generation system 220 may be configured to generate a similarity metric based on data model output, including data model output representing a property of the data model. For example, item generation system 220 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The item generation system 220 may be configured to classify a dataset. Classifying a dataset may include determining whether a dataset is related to another dataset. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The item generation system 220 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, item generation system 220 is configured to generate and/or train a classification model to classify a dataset, consistent with disclosed embodiments.

The item generation system 220 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the asset detection system may analyze information applying machine-learning methods.

While the item generation system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the item generation system 220 may include a greater or lesser number of components than those illustrated.

FIG. 3 is a block diagram of an example system that may be used to view and interact with travel recommendation system 308, according to an example implementation of the disclosed technology. The components and arrangements shown in FIG. 3 are not intended to limit the disclosed embodiments as the components used to implement the disclosed processes and features may vary. As shown, travel recommendation system 308 may interact with a user device 302 via a network 306. In certain example implementations, the travel recommendation system 308 may include a local network 312, an item generation system 220, a web server 310, and a database 316.

In some embodiments, a respective user may operate the user device 302. The user device 302 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the travel recommendation system 308. In some embodiments, the user device 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the travel recommendation system 308. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The item generation system 220 may include programs (scripts, functions, algorithms) to configure data for visualizations and provide visualizations of datasets and data models on the user device 302. This may include programs to generate graphs and display graphs. The item generation system 220 may include programs to generate histograms, scatter plots, time series, or the like on the user device 302. The item generation system 220 may also be configured to display properties of data models and data model training results including, for example, architecture, loss functions, cross entropy, activation function values, embedding layer structure and/or outputs, convolution results, node outputs, or the like on the user device 302.

The network 306 may be of any suitable type, including individual connections via the internet such as cellular or WiFi networks. In some embodiments, the network 306 may connect terminals, services, and mobile devices using direct connections such as RFID, NFC, Bluetooth™. BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The travel recommendation system 308 may be associated with and optionally controlled by one or more entities such as a business, corporation, individual, partnership, or any other entity that provides one or more of goods, services, and consultations to individuals such as customers. In some embodiments, the travel recommendation system 308 may be controlled by a third party on behalf of another business, corporation, individual, partnership. The travel recommendation system 308 may include one or more servers and computer systems for performing one or more functions associated with products and/or services that the organization provides.

Web server 310 may include a computer system configured to generate and provide one or more websites accessible to customers, as well as any other individuals involved in accessing travel recommendation system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that are authenticated by the item generation system 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the travel recommendation system 308 to interact with one another and to connect to the network 306 for interacting with components in the system 300 environment. In some embodiments, the local network 312 may include an interface for communicating with or linking to the network 306. In other embodiments, certain components of the travel recommendation system 308 may communicate via the network 306, without a separate local network 306.

The travel recommendation system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access travel recommendation system 308 using the cloud computing environment. User device 302 may be able to access travel recommendation system 308 using specialized software. The cloud computing environment may eliminate the need to install specialized software on user device 302.

In accordance with certain example implementations of the disclosed technology, the travel recommendation system 308 may include one or more computer systems configured to compile data from a plurality of sources, such as the item generation system 220, web server 310, and/or the database 316. The item generation system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

In one example, Susan may be getting ready for an upcoming business trip, and may use a credit card to book a flight, a rental car, and a hotel. The financial institution associated with Susan's credit card may be able to track her incoming transactions and provide a system that may use Susan's incoming transaction data to determine a likelihood that Susan is preparing for an upcoming trip. Based on making such determination, the system may send Susan a notification through a mobile application, the notification being a push-notification that says: "We see you might be planning a trip. Please upload a photo of what you plan to pack." Susan, while packing her bag for the trip, may take a photo of the clothes and items she plans to bring (e.g., after laying them out on a table) and may upload that photo within the mobile application. The system may then be configured, using computer vision technology, to identify the items Susan plans to bring on her trip. Based on that item identification, the system may send Susan another notification through the mobile application, the notification being a push-notification that says: "You may be interested in also packing a water bottle, a pair of headphones, or a purse."

During Susan's trip, the system may be configured to monitor certain data associated with Susan's travel destination. For example, based on the flight, rental car, and hotel reservations, the system may have determined Susan is in Boston, Massachusetts. The system may be configured to track data associated with Boston, for example, the weather in Boston throughout the time period of Susan's trip such that the system can notify Susan in the event she may need any additional clothing or items she may not have brought with her. For example, the system may see that a rainstorm is now showing up on the weather forecast. The system may thus send Susan another notification through the mobile application, the notification saying: "We see rain in the forecast for Wednesday. You may consider purchasing an umbrella or rain jacket." Upon receiving such notification, Susan may be able to open the mobile application on her phone to view a listing of item recommendations including an umbrella and a rain jacket. Susan may be able to click a button next to "rain jacket" listed on the screen, which may cause another screen to pop up. This second screen may provide Susan with a listing of selectable buttons and drop-down menus such that Susan can make selections to have the rain jacket delivered to her hotel by Tuesday, in preparation for the rain on Wednesday.

Upon receiving Susan's selections, the system may be configured to conduct a search for various rain jackets, the search based on a set of previously provided user preferences. For example, Susan may have previously created a user profile within the mobile application, the user profile including her travel item and clothing preferences, such as clothing and shoe sizes, color and/or style preferences, cost preferences, merchant preferences, etc. After conducting the search, the system may be configured to send Susan another notification through the mobile application, the notification providing a listing of several rain jacket options. Susan may then be able to select which rain jacket she prefers. Upon receiving Susan's selection, the system may be configured to purchase the item on Susan's behalf (e.g., if Susan has previously provided her credit card information in her user profile), and schedule delivery to Susan's hotel by Tuesday.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive transaction data associated with a user; responsive to receiving the transaction data, cause a user device associated with the user to display a notification, via a graphical user interface (GUI), prompting the user to provide first image data; responsive to causing the user device to display the notification, receive the first image data; identify, from the first image data via computer vision, one or more first objects; generate, via a machine learning model (MLM), one or more first item recommendations based on the one or more first objects; cause the user device to display, via the GUI, the one or more first item recommendations; receive one or more types of travel data; generate, via the MLM, one or more second item recommendations based on the one or more types of travel data; and transmit, to a merchant system, a request to purchase at least one item at a predefined location based on the one or more second item recommendations.

Clause 2: The system of clause 1, wherein the transaction data indicates a likelihood the user is planning an upcoming trip.

Clause 3: The system of clause 1, wherein the first image data is received in real-time via a smart device.

Clause 4: The system of clause 1, wherein the instructions are further configured to: cause the user device to display, via the GUI, the one or more second item recommendations and a second notification prompting the user to provide a selection to one or more user input objects; and receive, from the user via the user device, the selection to the one or more user input objects, wherein transmitting the request is based on receiving the selection.

Clause 5: The system of clause 1, wherein the one or more types of travel data are received via one or more third-party application programming interfaces (APIs).

Clause 6: The system of clause 1, wherein the one or more types of travel data comprise one or more of travel advisories, weather information, climate conditions, travel activities, or combinations thereof.

Clause 7: The system of clause 1, wherein the one or more types of travel data comprise keywords and phrases, and are received via a voice-controlled virtual assistant.

Clause 8: A system comprising: one or more processors; and a memory in communication with the one or more processors and storing instructions that, when executed by the one or more processors, are configured to cause the system to: receive first transaction data associated with a user; responsive to receiving the first transaction data, cause a user device associated with the user to display a notification, via a graphical user interface (GUI), prompting the user to provide first image data; responsive to causing the user device to display the notification, receive the first image data; identify, from the first image data via computer vision, one or more first objects; generate, via a machine learning model (MLM), one or more first item recommendations based on the one or more first objects; cause the user device to display, via the GUI, the one or more first item recommendations; receive second transaction data associated with the user; generate, via the MLM, one or more second item recommendations based on the second transaction data; and cause the user device to display, via the GUI, the one or more second item recommendations.

Clause 9: The system of clause 8, wherein: the first transaction data indicates a likelihood the user is planning an upcoming trip; and the second transaction data is received after causing the user device to display the one or more first item recommendations.

Clause 10: The system of clause 8, wherein the instructions are further configured to: receive one or more types of travel data; generate, via the MLM, one or more third item recommendations based on the one or more types of travel data; and cause the user device to display, via the GUI, the one or more third item recommendations.

Clause 11: The system of clause 10, wherein the instructions are further configured to: cause the user device to display, via the GUI, a second notification prompting the user to provide a selection to one or more user input objects; receive, from the user via the user device, the selection to the one or more user input objects; and responsive to receiving the selection, transmit, to a merchant system, a request to purchase at least one item at a predefined location based on the one or more third item recommendations.

Clause 12: The system of clause 10, wherein the one or more types of travel data comprise one or more of travel advisories, weather information, climate conditions, travel activities, or combinations thereof.

Clause 13: The system of clause 10, wherein the one or more types of travel data comprise keywords and phrases, and are received via a voice-controlled virtual assistant.

Clause 14: The system of clause 8, wherein the instructions are further configured to: receive second image data associated with the user, wherein determining the one or more second item recommendations is further based on the second image data.

Clause 15: A system comprising: one or more processors; and a memory in communication with the one or more processors and storing instructions that, when executed by the one or more processors, are configured to cause the system to: receive transaction data associated with a user; generate, via a machine learning model (MLM), one or more first item recommendations based on the transaction data; cause a user device associated with the user to display, via a graphical user interface (GUI), the one or more first item recommendations; receive one or more types of travel data; generate, via the MLM, one or more second item recommendations based on the one or more types of travel data; and transmit, to a merchant system, a request to purchase at least one item at a predefined location based on the one or more second item recommendations.

Clause 16: The system of clause 15, wherein the instructions are further configured to: cause the user device to display, via the GUI, the one or more second item recommendations and a notification prompting the user to provide a selection to one or more user input objects; and receive, from the user via the user device, the selection to the one or more user input objects, wherein transmitting the request is based on receiving the selection.

Clause 17: The system of clause 15, wherein the instructions are further configured to: responsive to receiving the transaction data, cause the user device to display a notification, via the GUI, prompting the user to provide image data; responsive to causing the user device to display the notification, receive the image data; and identify, from the image data via computer vision, one or more first objects, wherein generating the one or more first item recommendations is further based on the one or more first objects.

Clause 18: The system of clause 15, wherein the one or more types of travel data are received via one or more third-party application programming interfaces (APIs).

Clause 19: The system of clause 15, wherein the one or more types of travel data comprise one or more of travel advisories, weather information, climate conditions, travel activities, or combinations thereof.

Clause 20: The system of clause 15, wherein the one or more types of travel data comprise keywords and phrases, and are received via a voice-controlled virtual assistant.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment." "an embodiment," "some embodiments," "example embodiment," "various embodiments." "one implementation." "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second." "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

one or more processors; and a memory in communication with the one or more processors and storing instructions that, when executed by the one or more processors, are configured to cause the system to:

receive transaction data associated with a user;

determine whether the user is planning an upcoming trip by:

identifying in the transaction data a merchant identifier associated with a location outside of a home location of the user; and determining a likelihood the user is planning the upcoming trip based on the location associated with the merchant identifier;

responsive to receiving the transaction data and determining the user is planning the upcoming trip, cause a user device associated with the user to display a notification, via a graphical user interface (GUI), prompting the user to provide first image data;

responsive to causing the user device to display the notification, receive, via an application comprising an image capture feature, the first image data;

identify, from the first image data via computer vision, one or more first objects by tagging and categorizing the one or more first objects in the first image data, wherein the one or more first objects comprise one or more items the user plans to bring on the upcoming trip;

generate, via a machine learning model (MLM), one or more first item recommendations based on the one or more first objects and historical transaction data associated with the user;

generate a graphical user interface (GUI) comprising the one or more first item recommendations;

transmit the GUI to the user device to display the one or more first item recommendations;

receive one or more types of travel data;

generate, via the MLM, one or more second item recommendations based on the one or more types of travel data; and transmit, to a merchant system, a request to purchase at least one item at a predefined location based on the one or more second item recommendations.

2. The system of claim 1, wherein the instructions are further configured to:

cause the user device to display, via the GUI, the one or more second item recommendations and a second notification prompting the user to provide a selection to one or more user input objects; and receive, from the user via the user device, the selection to the one or more user input objects, wherein transmitting the request is based on receiving the selection.

3. The system of claim 1, wherein the one or more types of travel data comprise one or more of travel advisories, weather information, climate conditions, travel activities, or combinations thereof.

4. The system of claim 1, wherein the instructions are further configured to cause the system to:

determine a relevance associated with the one or more first objects based on the historical transaction data associated with the user by determining historically purchased objects from historical trips purchased ahead of or during the historical trips.

5. The system of claim 4, wherein determining the relevance associated with the one or more first objects based on the historical transaction data associated with the user further comprises:

determining a purpose associated with the historical trips based on historical destinations.

6. The system of claim 1, wherein the instructions are further configured to cause the system to:

receive one or more statements from the user device; and identify keywords and phrases in the one or more statements based on conversations between the user and one or more other individuals, wherein the one or more first item recommendations are further based on the keywords and the phrases.

7. The system of claim 6, wherein the user indicates in the conversations that one or more first items of the one or more first objects are needed for the upcoming trip.

8. The system of claim 1, wherein the instructions are further configured to cause the system to:

monitor real-time changes to the one or more types of travel data during the upcoming trip; and automatically update the one or more second item recommendations to generate one or more third item recommendations based on the real-time changes without user input.

9. The system of claim 1, wherein the MLM is trained using:

historical correlation data between the one or more first objects from the first image data and successful trip outcomes; and user feedback data indicating satisfaction levels with the one or more first item recommendations and the one or more second item recommendations.

10. A system comprising:

one or more processors; and a memory in communication with the one or more processors and storing instructions that, when executed by the one or more processors, are configured to cause the system to:

receive first transaction data associated with a user;

responsive to receiving the first transaction data:

generate a graphical user interface (GUI) comprising a notification; and transmit the GUI to a user device associated with the user to display the notification thereby prompting the user to provide first image data via an image capture feature;

responsive to transmitting the GUI to the user device to display the notification, receive the first image data;

identify, from the first image data via computer vision, one or more first objects by tagging and categorizing the one or more first objects in the first image data;

generate, via a machine learning model (MLM), one or more first item recommendations based on the one or more first objects and customer preferences associated with the user by comparing the one or more first objects to items in a database;

modify the GUI to generate a modified GUI comprising the one or more first item recommendations;

transmit the modified GUI to the user device to display the one or more first item recommendations;

receive second transaction data associated with the user;

determine whether the user accepted any of the one or more first item recommendations based on the second transaction data, wherein the second transaction data is associated with a date after the one or more first item recommendations are transmitted to the user via the modified GUI;

generate, via the MLM, one or more second item recommendations based on the second transaction data and the accepted one or more first item recommendations; and cause the user device to display, via the GUI, the one or more second item recommendations.

11. The system of claim 10, wherein the instructions are further configured to:

receive one or more types of travel data;

generate, via the MLM, one or more third item recommendations based on the one or more types of travel data; and cause the user device to display, via the GUI, the one or more third item recommendations.

12. The system of claim 11, wherein the instructions are further configured to:

cause the user device to display, via the GUI, a second notification prompting the user to provide a selection to one or more user input objects;

receive, from the user via the user device, the selection to the one or more user input objects; and responsive to receiving the selection, transmit, to a merchant system, a request to purchase at least one item at a predefined location based on the one or more third item recommendations.

13. The system of claim 11, wherein the one or more types of travel data comprise one or more of travel advisories, weather information, climate conditions, travel activities, or combinations thereof.

14. The system of claim 10, wherein the instructions are further configured to:

receive second image data associated with the user, wherein determining the one or more second item recommendations is further based on the second image data.

15. A system comprising:

one or more processors; and a memory in communication with the one or more processors and storing instructions that, when executed by the one or more processors, are configured to cause the system to:

receive transaction data associated with a user;

determine whether the user is planning an upcoming trip by:

identifying in the transaction data a merchant identifier associated with a location outside of a home location of the user; and determining a likelihood the user is planning the upcoming trip based on the location and first transaction data associated with the merchant identifier;

in response to determining the user is planning the upcoming trip, generate, via a machine learning model (MLM) using a predefined database of items, one or more first item recommendations based on one or more of the transaction data, customer preferences, and historical transaction data associated with the user;

generate a graphical user interface (GUI) comprising the one or more first item recommendations;

transmit the GUI to a user device associated with the user to display the one or more first item recommendations;

receive one or more types of travel data;

generate, via the MLM, one or more second item recommendations based on the one or more types of travel data; and transmit, to a merchant system, a request to purchase at least one item at a predefined location based on the one or more second item recommendations.

16. The system of claim 15, wherein the instructions are further configured to:

cause the user device to display, via the GUI, the one or more second item recommendations and a notification prompting the user to provide a selection to one or more user input objects; and receive, from the user via the user device, the selection to the one or more user input objects, wherein transmitting the request is based on receiving the selection.

17. The system of claim 15, wherein the instructions are further configured to:

responsive to receiving the transaction data, cause the user device to display a notification, via the GUI, prompting the user to provide image data;

responsive to causing the user device to display the notification, receive the image data; and identify, from the image data via computer vision, one or more first objects, wherein generating the one or more first item recommendations is further based on the one or more first objects.

18. The system of claim 15, wherein the one or more types of travel data are received via one or more third-party application programming interfaces (APIs).

19. The system of claim 15, wherein the one or more types of travel data comprise one or more of travel advisories, weather information, climate conditions, travel activities, or combinations thereof.

20. The system of claim 15, wherein the one or more types of travel data comprise keywords and phrases, and are received via a voice-controlled virtual assistant.

* * * * *